July 10, 1945.   E. E. JELLEY ET AL   2,380,241
VIEWING SYSTEM
Filed March 21, 1942

HENRY C. STAEHLE
EDWIN E. JELLEY
INVENTORS

BY Newton M Perry
F M Emerson Holmes
ATTY & AG'T

Patented July 10, 1945

2,380,241

UNITED STATES PATENT OFFICE 2,380,241

VIEWING SYSTEM

Edwin E. Jelley and Henry C. Staehle, Rochester, N. Y., assignors to Eastman Kodak Company, Rochester, N. Y., a corporation of New Jersey Application March 21, 1942, Serial No. 435,672

1 Claim. (Cl. 88—28.93)

This invention relates to viewing systems such as pictures or diffusing screens onto which pictures are projected. The screen may be in the form of a translucent screen used for rear projection or for focusing in a camera.

It is the main object of the invention to reduce the reflections of light from the front when viewing pictures or particularly when viewing images displayed on a diffusing screen. The application of the invention to rear projection systems or other so-called daylight projection systems is important.

According to the invention there is provided a viewing system comprising a picture plane, which may contain a record or which may be adapted to receive an optical image projected thereonto. A window is placed in front of this plane either at some distance away from it or laminated thereto. This window consists of a circularly polarizing filter facing away from the plane to polarize circularly light from the front only. Of course, it doesn't have to be a perfect polarizer, but the efficiency of the system depends on the degree to which it does circularly polarize. Such a system prevents any light which passes through the window from the front and is reflected from the plane, unless depolarized, from passing again through the window. Thus annoying front surface reflections are minimized or eliminated. Also, such a system requires some means for illuminating the picture in said plane other than by sending light through the window through which the picture is viewed. The illumination may come from behind as in a rear projection system or may come from the front if there is sufficient space to admit the light between the picture plane and the circularly polarizing window.

In the laminated embodiment of the invention, a translucent screen which is to display images projected thereonto from the rear has on its front surface a circularly polarizing filter facing away from the screen. If the translucent screen in this embodiment is a ground glass with the ground surface on the rear, the present invention may be combined with that described in our co-pending application, Serial No. 429,622, filed February 5, 1942. This combination consists of a translucent plate the rear surface of which is rough and coated with an optical interference layer for reducing reflection and the front surface of which carries, preferably laminated thereto, a substantially circularly polarizing layer facing away from the translucent plate.

The simplest form of circular polarizer, mounted to face away from the picture plane, consists of a quarter wave retardation plate immediately in front of the plane and a plane polarizer in front of this quarter wave retardation plate with the vibration plane of the polarizer at 45 degrees to the vibration planes of the retardation plate.

The invention, its objects and advantages, will be understood from the following description when read in connection with the accompanying drawing, in which.

Figure 3:
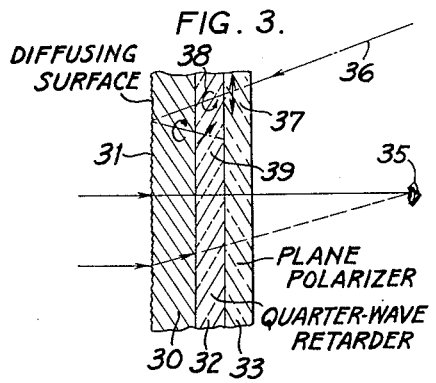
Figure 4:
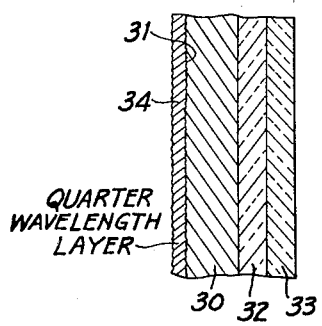
Figure 5:
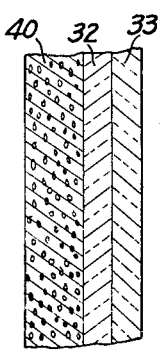

Figs. 3, 4, and 5 are large cross sections of translucent screens incorporating the invention.

Figure 6:
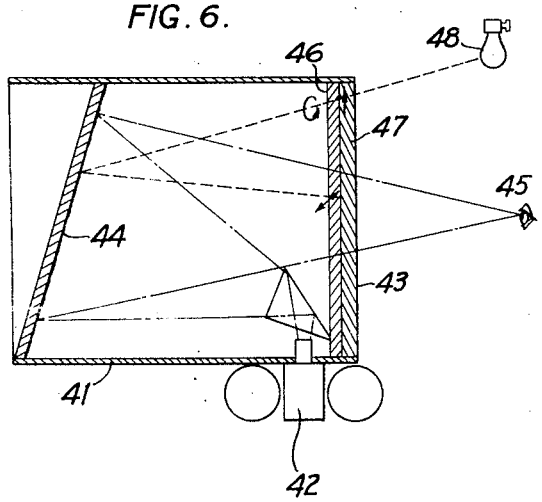

Fig. 6 illustrates a different form of daylight projection system.

Figure 1:
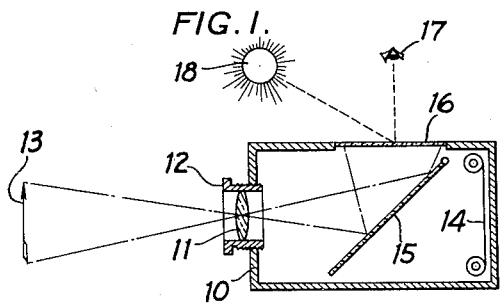
Fig. 1 shows a camera incorporating the invention on the ground glass.

In Fig. 1 a camera 10 has a lens 11 carried in a focusing mount 12 to receive light from an object 13 and to project an image thereof either onto a film 14 or if a reflex mirror 15 is in place as shown, onto a translucent screen 16. This image is viewed by an eye 17, but light from any extraneous source such as shown at 18 falling on the screen 16 tends to annoy the observer and to reduce the contrast of the image on the screen 16 if this extraneous light is diffused or otherwise reflected to the eye 17. The present invention is to reduce such extraneous reflections.

Figure 2:
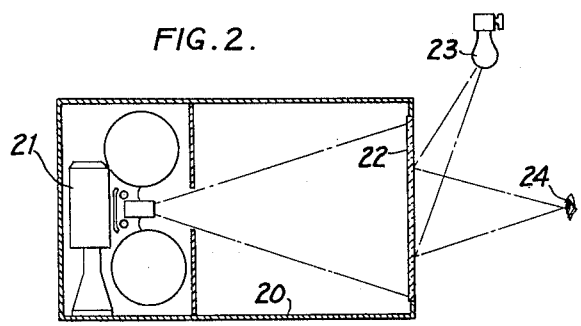
Fig. 2 illustrates a rear projection system incorporating the invention.

In Fig. 2 a rear projection system having a housing 20 and a projector 21 displays an optical image on a translucent screen 22 to be viewed by the eye 24 of an observer. As before, an extraneous light source such as 23 will, in the absence of the present invention, produce annoying front reflections.

Figs. 3, 4, and 5 show different forms of screens which may be used in either Fig. 1 or Fig. 2 or in similar systems in which an optical image is projected from the rear onto a translucent screen for display thereof. In Fig. 3 the screen consists of a layer 30 the rear surface of which 31 is diffusing, and the front surface of which carries a circular polarizer facing away from the layer 30. This circular polarizer in the embodiment shown consists of a quarter wave retardation plate 32 on the front surface of which is a plane polarizing layer 33 with its vibration axis oriented at 45 degrees to the optic axis of the quarter wave retardation layer 32. The eye 35 of an observer is positioned to view an optical image displayed by the rough surface 31 and according to the invention is prevented from receiving light originating extraneously. The extraneous ray 36 on passing through the plane polarizer 33 is plane polarized as shown by the double-headed arrow 37 and after passing through the quarter-wave retardation plate 32 is circularly polarized as shown by the circle 38. After reflection at the layer 31, at least part of this ray is still circularly polarized, but is rotating in the opposite direction when it strikes the quarter-wave retardation layer 32, and on passing through this layer it again becomes plane-polarized as indicated by the double-headed arrow 39. But the plane of polarization is crossed with respect to the plane polarizer 33 and, hence, the light is cut off by this plane polarizer and cannot reach the eye 35 of the observer.

Fig. 4 shows a combination of the invention illustrated in Fig. 3 with the invention of our copending application 429,622 mentioned above. In Fig. 4, an optical interference layer 34 is coated on the rough surface 31 of the translucent layer 30 and in this embodiment the rough surface of the layer 30 is the only diffusing medium. Attention is drawn to the difference between a quarter-wave retardation layer which is well known to those skilled in the study of polarized light and an optical interference layer which, if it is a single layer, is generally just one-quarter wave length thick. A quarter-wave retardation layer is usually much thicker; i. e., of sufficient thickness for the ordinary and extraordinary rays passing therethrough to gain a difference in phase of one-quarter wave length.

In Fig. 5 the translucent layer 40 has the diffusing medium scattered therethrough instead of a ground surface.

In Fig. 6 a different form of daylight projection system is shown in which a housing 41 is arranged with a side opening through which light from a source 42 passes to a prism 43 and is reflected to illuminate an image on a picture plane 44. That is, the picture may be in the plane 44 and the source 42 merely provide general illumination or the picture may be projected from the source 42 to a diffusing screen in the plane 44. Preferably this plane is a ground surface of a metal sheet. In front of the picture plane 44 is a window containing a circular polarizer consisting of a quarter-wave retardation layer 46 and a plane polarizer 47, through which window the eye 45 of an observer may observe the picture in the plane 44. As explained in connection with Fig. 3, light from an extraneous source 48 on passing through the window and striking the screen 44 is, to the extent it remains polarized circularly, stopped by the polarizer 47 and is thus prevented from reaching the eye 45.

Reference is made to another embodiment of our invention applied to front projection systems described by Stephen A. MacNeille in copending application Serial Number 445,579 filed June 3, 1942.

Having thus described the preferred embodiments of our invention, we wish to point out that it is not limited to these structures but is of the scope of the appended claim.

What we claim and desire to secure by Letters Patent of the United States is:

A screen for displaying optical images projected thereonto from the rear comprising a translucent plate the rear surface of which is rough, an optical interference layer for reducing reflection coated on the rough surface and colorless means through which to view images displayed by the rough surface, consisting of a substantially circularly polarizing layer on the front surface of and facing away from the translucent plate.

EDWIN E. JELLEY.
HENRY C. STAEHLE.